(12) United States Patent
Fleck et al.

(10) Patent No.: US 11,718,279 B2
(45) Date of Patent: Aug. 8, 2023

(54) CABLE-COUPLED BY-WIRE CONTROL SYSTEM

(71) Applicants: James Fleck, Warren, MI (US); Brian Neumeyer, Auburn Hills, MI (US); Paul Fleck, Troy, MI (US)

(72) Inventors: James Fleck, Warren, MI (US); Brian Neumeyer, Auburn Hills, MI (US); Paul Fleck, Troy, MI (US)

(73) Assignee: DATASPEED INC., Rochester Hills, MI (US)

( * ) Notice: Subject to any disclaimer, the term of this patent is extended or adjusted under 35 U.S.C. 154(b) by 254 days.

(21) Appl. No.: 17/206,390

(22) Filed: Mar. 19, 2021

(65) Prior Publication Data

US 2022/0297642 A1  Sep. 22, 2022

(51) Int. Cl.
  *B60T 7/12* (2006.01)
  *B60T 7/04* (2006.01)
  *F16C 1/18* (2006.01)

(52) U.S. Cl.
  CPC .... *B60T 7/12* (2013.01); *B60T 7/04* (2013.01); *F16C 1/18* (2013.01); *B60T 2201/03* (2013.01)

(58) Field of Classification Search
  CPC .......... B60T 7/04; B60T 7/12; B60T 2201/03; F16C 1/18; F16H 55/52; B66D 3/04
  See application file for complete search history.

(56) References Cited

U.S. PATENT DOCUMENTS

| | | | | |
|---|---|---|---|---|
| 5,319,881 A | * | 6/1994 | Kuhlman | E05F 15/646 49/138 |
| 6,038,818 A | * | 3/2000 | Haag | E05F 15/646 49/360 |
| 2004/0099085 A1 | * | 5/2004 | Olofsson | G05G 1/30 74/513 |
| 2004/0124697 A1 | * | 7/2004 | MacGregor | B60T 17/18 180/271 |
| 2004/0259687 A1 | * | 12/2004 | Ritter | B60K 26/021 477/187 |
| 2018/0043874 A1 | * | 2/2018 | Ayichew | B64C 25/44 |
| 2019/0016314 A1 | * | 1/2019 | Sanders | B60T 13/662 |
| 2022/0297642 A1 | * | 9/2022 | Fleck | F16C 1/18 |

\* cited by examiner

*Primary Examiner* — Vishal R Sahni
(74) *Attorney, Agent, or Firm* — Mark A Navarre

(57) ABSTRACT

A cable-coupled by-wire control of a vehicle control function traditionally activated by driver manipulation of a pedal is achieved though the agency of a Bowden cable having a first end fastened to the driver pedal, and a second end coupled to a by-wire actuator. The by-wire actuator has a pulley on which the second end of the cable is fastened, an electric motor coupled to the pulley to permit by-wire activation of the vehicle control function by rotation of the pulley in a direction to pull on the pedal with the cable. A relief chamber of the actuator radially outboard of the pulley accommodates slack in the cable within the actuator caused by driver manipulation of the pedal during by-wire activation of the control function.

3 Claims, 3 Drawing Sheets

CABLE-COUPLED BY-WIRE CONTROL SYSTEM

TECHNICAL FIELD

This invention relates to by-wire control of a vehicle control function traditionally activated by a driver manipulated pedal, and more particularly to a by-wire control arrangement in which the driver manipulated pedal is cable-coupled to a by-wire control actuator.

BACKGROUND OF THE INVENTION

By-wire activation of a vehicle control function such as braking can be implemented in a way that allows either by-wire brake activation or traditional manual brake activation by driver depression of a brake pedal. In addition to providing either by-wire or manual brake activation, such a system would ideally permit the driver to override the by-wire braking command to achieve increased braking effort. Accordingly, what is needed is a cost-effective by-wire control arrangement that satisfies these requirements.

SUMMARY OF THE INVENTION

The present invention is directed to an improved vehicle braking system (or more generally, a vehicle control function) including a by-wire brake actuator cable-coupled to the driver brake pedal to provide either by-wire or manual brake activation via the same brake pedal, while allowing the driver to increase the braking effort commanded by the by-wire actuator by further depressing the brake pedal. The actuator-end of the cable is wrapped around a pulley supported for rotation in a housing of the actuator, and during by-wire braking, an electric motor of the actuator rotates the pulley to a commanded position/angle to achieve a corresponding braking effort. The actuator housing includes a cable relief pocket radially outboard of the pulley to accommodate slack in the cable during an override condition characterized by driver activation of the brake pedal during by-wire brake activation.

DESCRIPTION OF THE PREFERRED EMBODIMENT

In general, the present invention is directed to an actuator mechanism for accomplishing by-wire control of a vehicle control function—service brake activation in the illustrated embodiment—traditionally activated by driver manipulation of a pedal (or lever). The actuator is cable-coupled to the pedal, and is configured when activated, to pull on the pedal or lever to achieve the same effect as driver manipulation of the pedal. When by-wire control is not active, the driver manipulates the pedal in the traditional manner while the cable free-wheels within the actuator. When by-wire control is active, the actuator positions the cable to activate the control function, but the driver retains the ability to override the by-wire control in a positive direction by further depressing the pedal.

Figure 1:
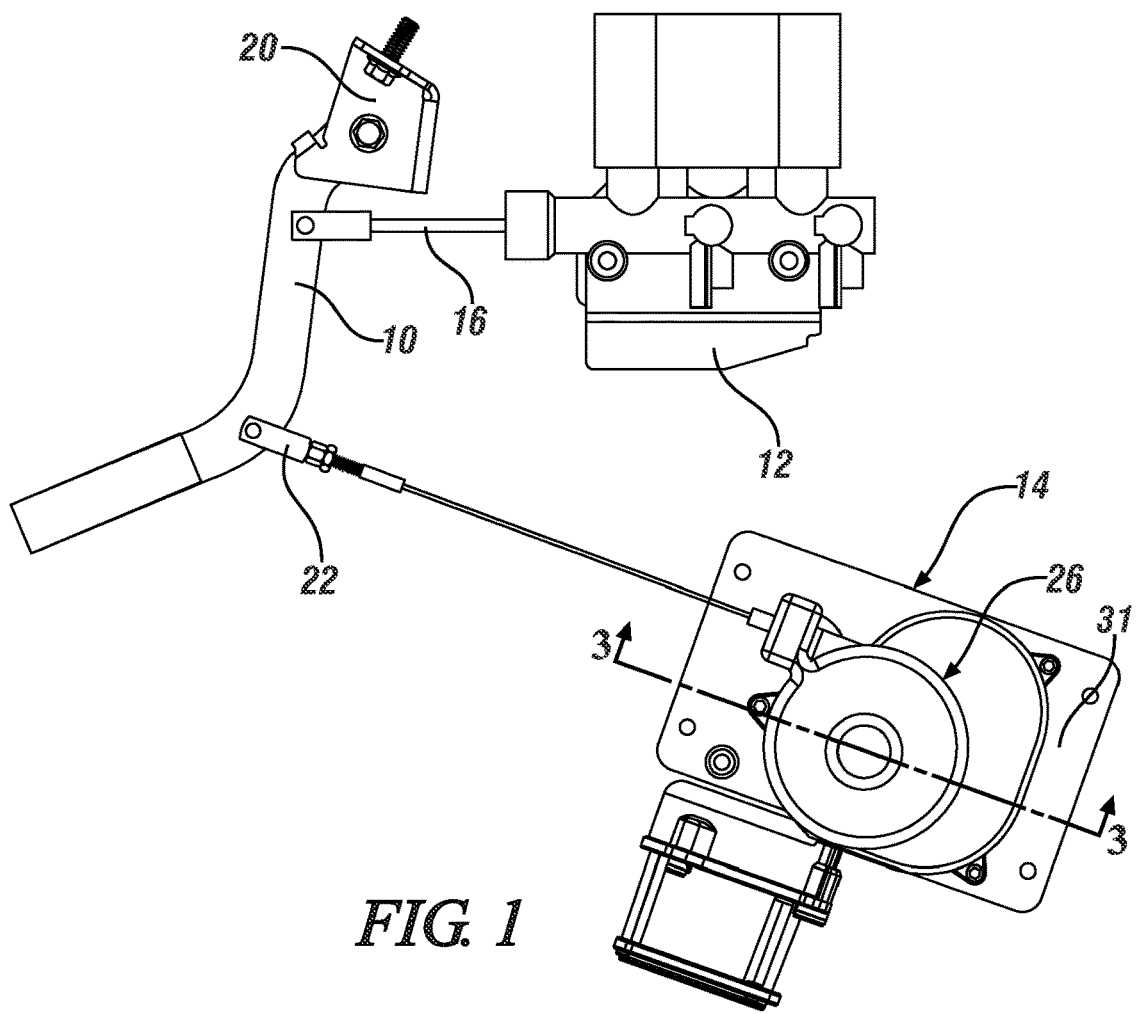
FIG. 1 is a system diagram of a by-wire vehicle brake control system according to the present invention, including a conventional brake pedal and hydraulic cylinder, and a by-wire actuator according to this invention.
Figure 2:
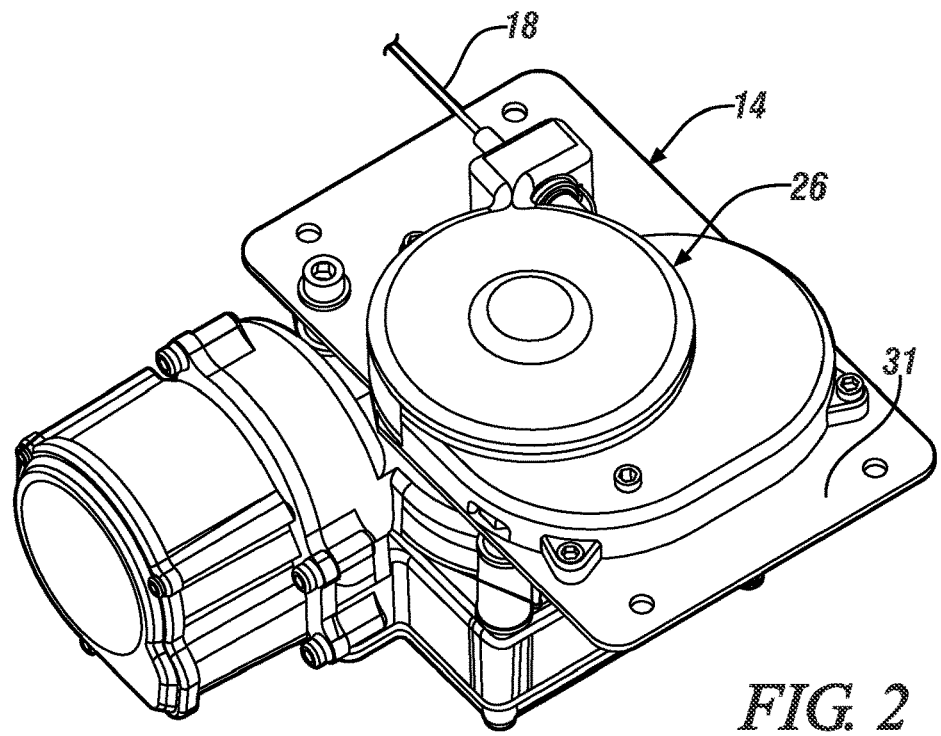
FIG. 2 is an isometric view of the by-wire actuator of FIG. 1.
Figure 3:
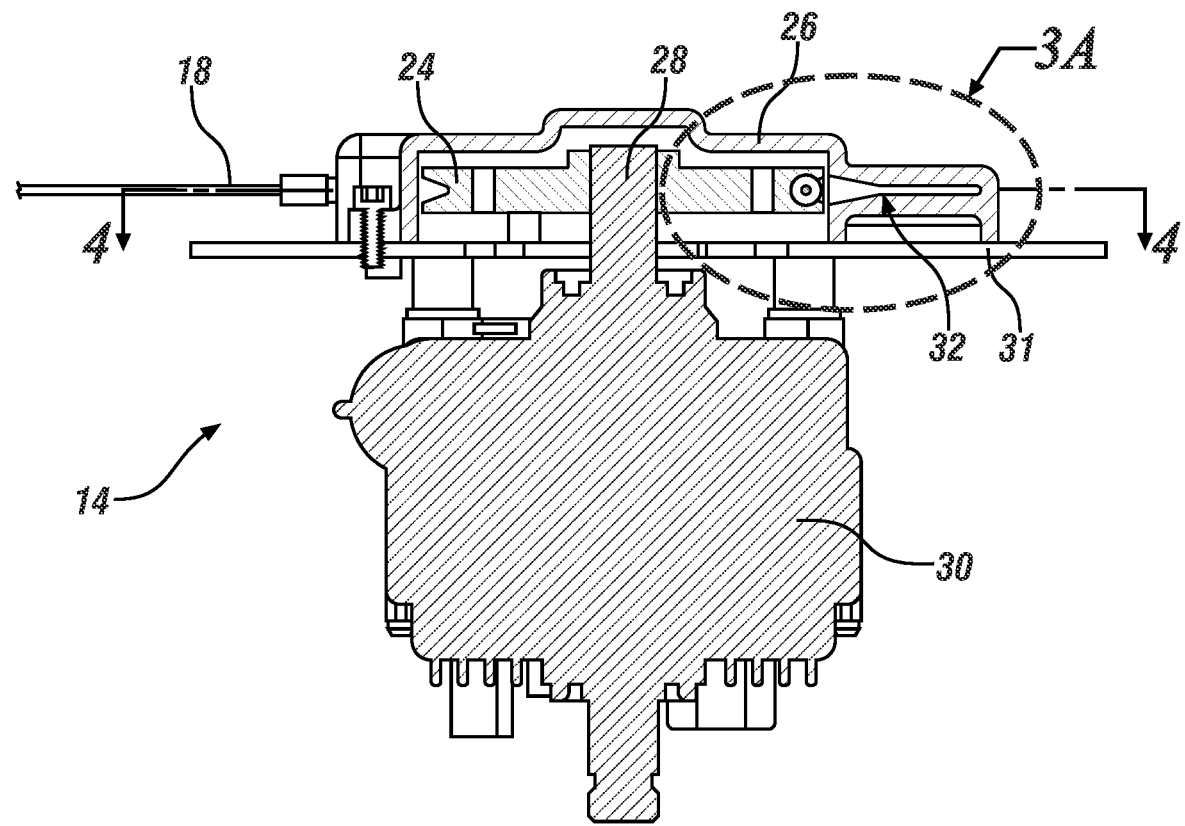
FIG. 3 is a cross-sectional view of the by-wire actuator of FIGS. 1-2, taken along line 3-3 of FIG. 1.

FIG. 1 illustrates the preferred embodiment of the above-described arrangement in the context of a vehicle braking system. The reference numeral 10 designates a brake pedal, the reference numeral 12 designates a hydraulic brake cylinder, and the reference numeral 14 designates an actuator according to this invention. As shown, the brake pedal 10 is mechanically coupled to the brake cylinder 12 by a piston rod 16, and to the actuator 14 by a Bowden cable 18. The mounting bracket 20 of brake pedal 10 includes a return spring (not shown) that biases the brake pedal 10 toward the illustrated rest position in which the braking function is not activated. The pedal-end of cable 18 is attached to the pedal 10 via a pinned bracket 22 that straddles the pedal 10 as shown, and the actuator-end of the cable 18 is fastened to a pulley 24 disposed within a pulley housing 26. As best shown in FIG. 3, the pulley 24 is mounted on the drive shaft 28 of an electric motor 30. The pulley housing 26 and the electric motor 30 are both fastened to a mounting plate 31.

When by-wire control is not active, the electric motor 30 is de-energized so that the pulley 24 can free-wheel, and the driver depresses the pedal 10 against the bias of the brake pedal return spring to activate the vehicle service brakes via the hydraulic cylinder 12. In this case, the pulley 24 will typically free-wheel to accommodate movement of the cable 18 within actuator 14 due to driver manipulation of the pedal 10. When by-wire control is active, the electric motor 30 of actuator 14 is energized to control the rotary orientation of the pulley 24, rotating the pulley 24 clockwise as viewed in FIGS. 3-4 so that the cable 18 pulls on brake pedal 10 against the bias of the brake pedal return spring when vehicle braking is commanded by a by-wire control unit (not shown). When the by-wire control is deactivated, the electric motor 30 is de-energized to release the pulley 24, and the brake pedal return spring returns the brake pedal 10 to its rest position, unwinding the cable 18 on pulley 24. Optionally, the actuator 14 may include a weak return spring that biases pulley 24 in a counter-clockwise direction as viewed in FIGS. 3-4 (that is, in a direction to assist the brake pedal return spring) to ensure that the brake pedal 10 consistently returns to its rest position when by-wire control of braking is not active.

Figure 3A:
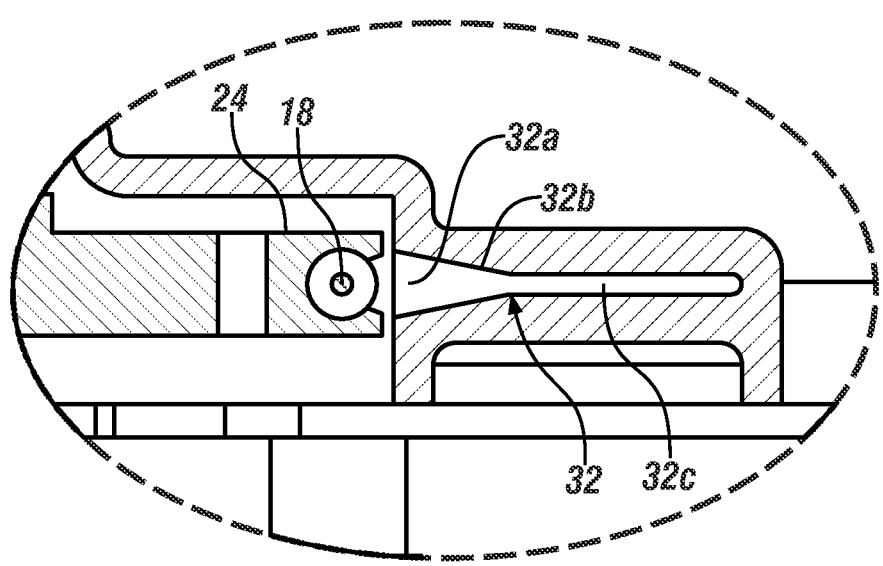
FIG. 3A is an enlarged view of a portion of FIG. 3, identified in FIG. 3 by the ellipse 3A.
Figure 4A:
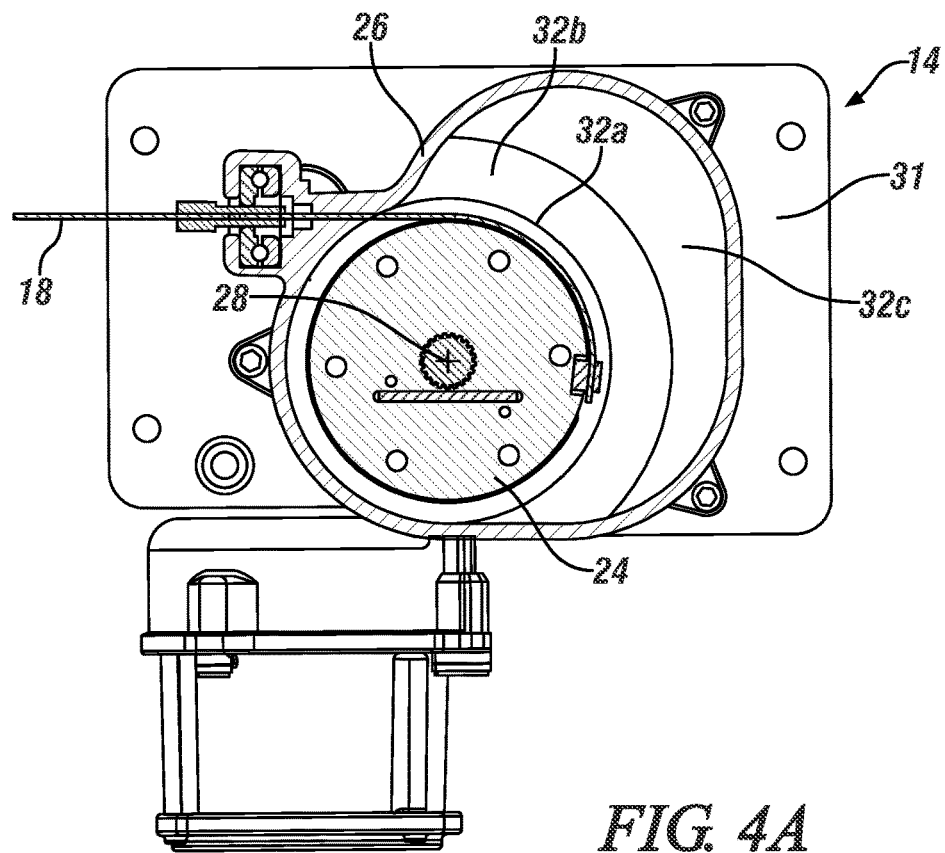
FIG. 4A is a cross-sectional view of the by-wire actuator of FIGS. 1-3, taken along line 4-4 of FIG. 3, depicting the actuator during normal by-wire control.
Figure 4B:
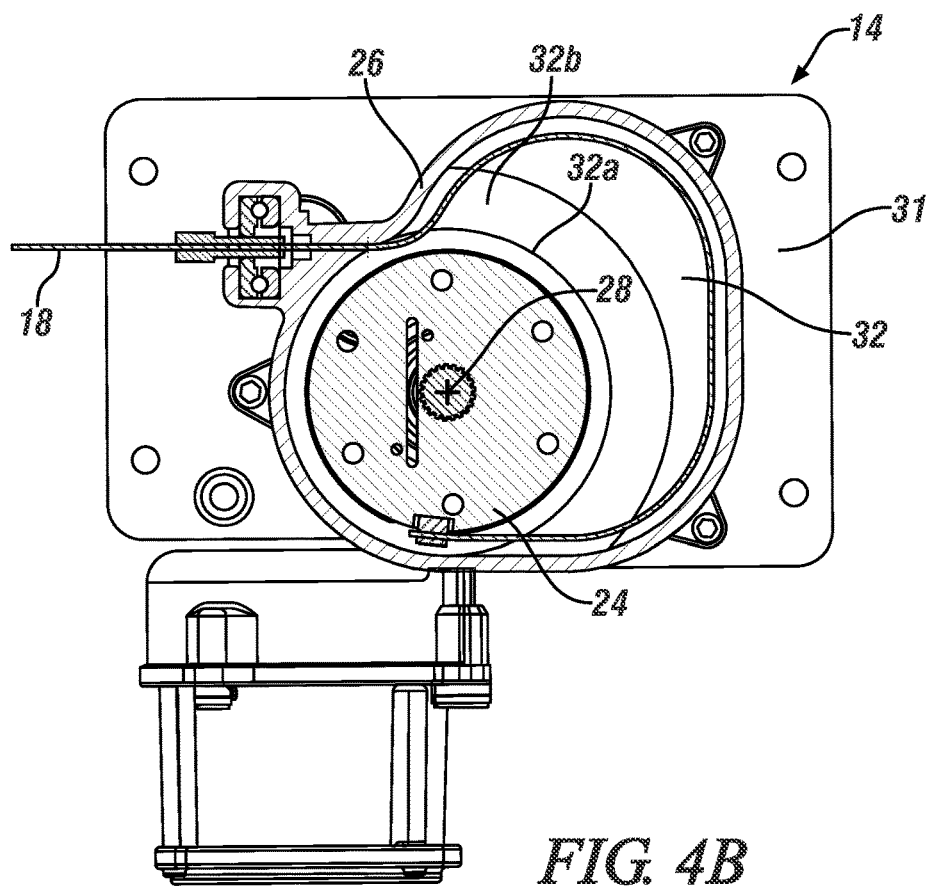
FIG. 4B is a cross-sectional view of the by-wire actuator of FIGS. 1-3, taken along line 4-4 of FIG. 3, depicting the actuator during driver override of by-wire control.

The subject cable-coupled by-wire control arrangement inherently permits the driver to effectively override the by-wire brake control by depressing the brake pedal 10 further than commanded by the actuator 14. This can occur, of course, whether or not the actuator 14 is actively commanding activation of the vehicle brakes. But when the actuator 14 is actively commanding vehicle braking, the electric motor 30 maintains a corresponding rotary orientation of the pulley 24, so that further depression of the brake pedal 10 by the driver makes the cable 18 lift off the pulley 24. This could possibly lead to kinking or jamming of the cable 18 within the actuator 16, and an important feature of the present invention lies in the provision of a cable-relief chamber 32 within the actuator housing 26. As seen in FIGS. 3-4, the cable relief chamber 32 is radially outboard of the pulley 24; and as seen most clearly in FIG. 3A, the cable relief chamber 32 includes an opening 32a that is adjacent to the radial periphery of the pulley 24, a narrow pocket 32c, a tapered lead-in portion 32b between the opening 32a and the pocket 32c. If the driver overrides by-wire braking by further depression of the brake pedal 10, effectively pushing the cable 18 into the actuator housing 26, the additional length of cable 18 (that is, the slack portion of the cable 18) within the actuator housing 26 will spool into the cable relief chamber 32 as illustrated in FIG. 4B until the driver lets up on the brake pedal 10, allowing the brake pedal return spring to draw the slack portion of cable 18 back out of the relief chamber 32 and to re-seat it on the pulley 24 as illustrated in FIG. 4A. The tapered lead-in portion 32b smoothly guides the slack portion of cable 18 into the pocket 32c, which is wide enough to accommodate only a single thickness of the cable 18.

As seen in all of the drawings, the radial perimeter of the chamber relief pocket 32c is gently curved to prevent kinking of the cable 18 when it spools into the pocket 32c. Furthermore, the cable relief chamber 32 is disposed radially outboard of the loaded portion of the pulley 24 (that is, the portion on which the cable 18 is firmly seated during by-wire brake control) so that when the cable 18 lifts off the pulley 24 due to a driver brake override, the cable 18 naturally spools into the cable relief chamber 32.

In summary, the present invention provides a way of performing cable-coupled by-wire control of a vehicle control function traditionally activated by driver manipulation of a pedal. The arrangement can be used to add by-wire capability to a traditional manually controlled system, or in an OEM application. It inherently permits driver overriding of a by-wire command, and ensures that cable slack caused by the driver override spools into a cable relief pocket or chamber within the by-wire actuator. It will be recognized that while the invention has been described in reference to vehicle service brake controls, it is applicable to other controls as well, and that numerous modifications and variations in addition to those mentioned herein will occur to those skilled in the art. Accordingly, it will be appreciated that systems and mechanisms incorporating these and other modifications and variations still fall within the intended scope of the invention.

The invention claimed is:

1. A by-wire control arrangement for a vehicle control function, comprising:

a pedal configured to be depressed by a driver to produce activation of said vehicle control function; and a by-wire control mechanism including a by-wire actuator, and a Bowden cable having a first end fastened to said pedal and a second end coupled to said by-wire actuator, said by-wire actuator including a pulley on which said second end of said cable is fastened, and an electric motor coupled to said pulley, where said by-wire actuator initiates by-wire activation of said control function by energizing said electric motor to control a rotary position of said pulley, and terminates said by-wire control by de-energizing said electric motor and allowing said pulley to free-wheel with driver depression of said pedal; and a housing enclosing said pulley, said housing including a cable relief chamber configured so that cable slack due to driver depression of said pedal during activation of said control function causes a portion of said cable to temporarily lift off said pulley and spool into said cable relief chamber before re-seating on said pulley, where said cable relief chamber includes an opening disposed adjacent to a radial periphery of said pulley and receives said portion of said cable when it lifts off said pulley, a narrow pocket radially outboard of said opening dimensioned to receive only a single thickness of said cable, and a tapered lead-in section between said opening and said narrow pocket configured to guide said portion of said cable into said narrow pocket.

2. The by-wire control arrangement of claim 1, wherein:

said vehicle control function is vehicle braking; and said pedal is a brake pedal.

3. The by-wire control arrangement of claim 1, where:

said narrow pocket of said cable relief chamber has a radial perimeter that is gently curved to prevent kinking of said portion of said cable when it spools into said cable relief chamber.

* * * * *